United States Patent [19]

Hodapp et al.

[11] 4,267,767

[45] May 19, 1981

[54] POSITION LOCK

[75] Inventors: Gary Hodapp, Mankato; Richard Peterson, Le Sueur; Richard Schulz, Lake Crystal, all of Minn.

[73] Assignee: Hiniker Company, Mankato, Minn.

[21] Appl. No.: 53,951

[22] Filed: Jul. 2, 1979

[51] Int. Cl.[3] ........................ F15B 13/04; F16H 21/02

[52] U.S. Cl. ........................................ 91/404; 91/445; 91/453; 74/100 R; 74/106; 74/520

[58] Field of Search ................. 91/367, 404, 405, 445, 91/453; 74/100 R, 106, 520

[56] References Cited

U.S. PATENT DOCUMENTS

| | | | |
|---|---|---|---|
| 523,419 | 7/1894 | Thorpe | 91/445 X |
| 858,858 | 7/1907 | Cummings | 74/520 |
| 2,382,059 | 8/1945 | Hutsell | 74/100 X |
| 2,970,653 | 2/1961 | Hershman | 91/367 X |
| 3,604,884 | 9/1971 | Olsson | 91/404 X |

*Primary Examiner*—Robert L. Bleutge
*Attorney, Agent, or Firm*—Merchant, Gould, Smith, Edell, Welter & Schmidt

[57] ABSTRACT

A manually operable position lock for a hydraulic actuator (10) adding a cylinder (20) and a piston rod (22) with a stop finger (61) for actuating a push rod (60) to close a valve (32) and prevent fluid egress from the cylinder. The lock includes a pivot bracket (110) carried by a push rod, a control lever (111) pivoted to the pivot bracket, a link (114) pivoted to the control lever and slidably receiving the push rod, and a helical spring (120) carried by the push rod and engaging one end of the link.

16 Claims, 5 Drawing Figures

POSITION LOCK

TECHNICAL FIELD

This invention relates to the field of machine design, and specifically to hydraulically actuated machinery having apparatus for releasably locking a moveable member at any position thereof against movement in a predetermined direction.

BACKGROUND OF THE PRIOR ART

It is known to provide a linear hydraulic actuator, having a piston reciprocable in a cylinder including fluid ports at its ends beyond the travel range of the piston, with a stop member adjustable along the piston rod projecting from one end of the cylinder, a valve operable to prevent egress of fluid from the other end of the cylinder, and means such as a push rod for enabling the stop member to operate the valve as the piston is retracted into the cylinder, thus hydraulically locking the actuator against further retraction of the piston.

SUMMARY OF THE INVENTION

This invention comprises a mechanism for use with an actuator as just described, by which the valve may be releasably operated at any time independently of the position of the piston in the cylinder.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DETAILED DESCRIPTION OF THE INVENTION

Figure 1:
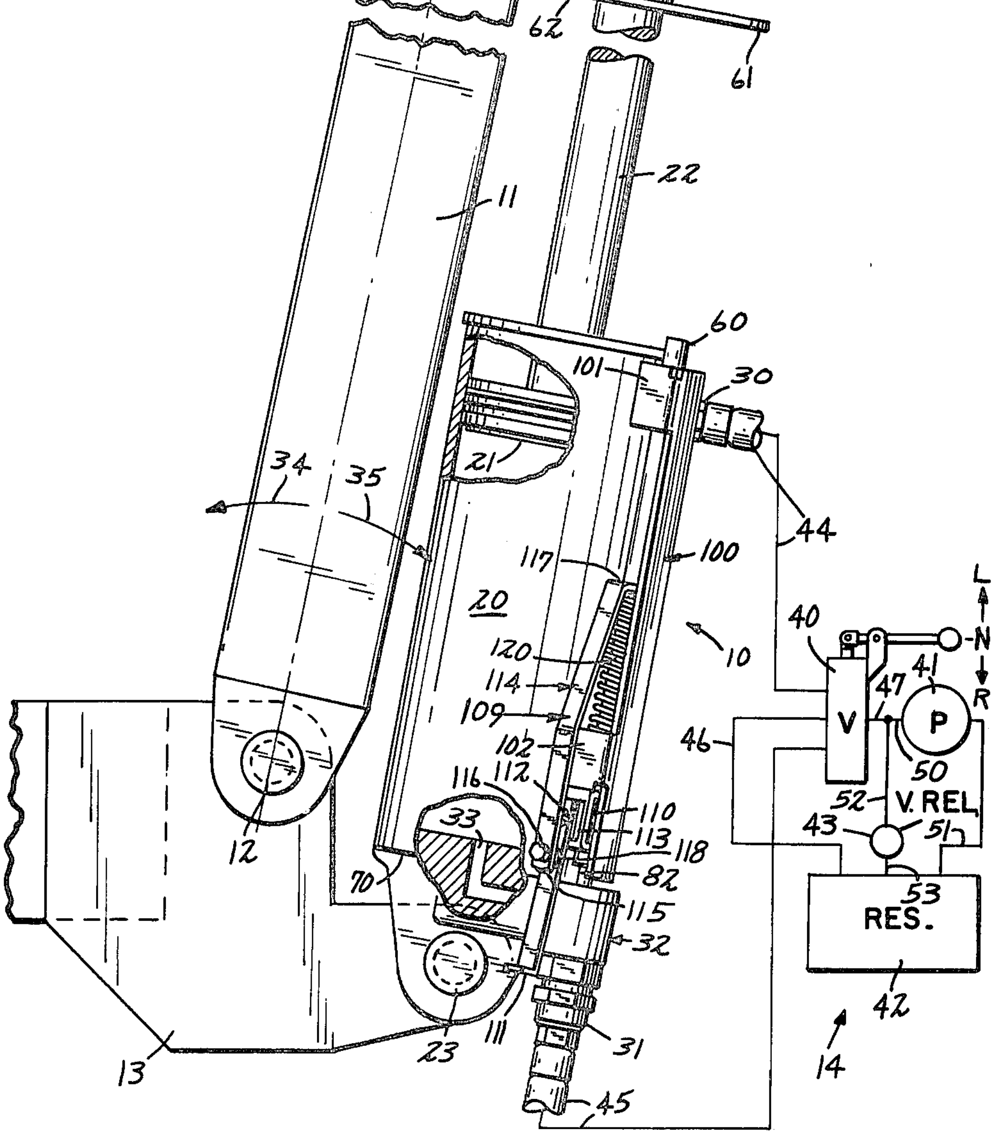
FIG. 1 is an elevational view of my invention in use with a machine shown only schematically, parts being broken away for clarity of illustration.

In FIG. 1 there is shown a linear hydraulic actuator or fluid motor 10 arranged to pivot a first mechanical member or arm 11 about a pivot pin 12 with respect to a second mechanical member or frame 13, under the control of a hydraulic control system 14. Actuator 10 comprises a cylinder 20 in which a piston 21 including a piston rod 22 is mounted for reciprocation through a predetermined range or stroke. Cylinder 20 is pivoted to frame 13 at a pivot pin 23, and a clevis 24 connects the piston rod to a bracket 25, fixed to arm 11, by means of a pivot pin 26.

Near one end of cylinder 20 there is a port 30 for power fluid, and at the other end of the cylinder there is provided a port fitting 31 which communicates with the cylinder through a normally-open valve 32 and a passage 33. Extension of actuator 10 causes rotation of arm 11 in the direction of arrow 34, and retraction of the actuator causes rotation of arm 11 in the direction of arrow 35.

Hydraulic control system 14 is shown to comprise a manual valve 40 of conventional construction, a pump 41, a reservoir 42, and a pressure relief valve 43. Valve 40, shown only schematically, is connected by conduit 44 with port 30, by conduit 45 with port fitting 31, by conduit 46 with reservoir 42, and by conduits 47 and 50 with pump 41, which in turn is connected to reservoir 42 by conduit 51. Valve 43 is connected to pump 41 through conduits 50 and 52, and to reservoir 42 by conduit 53.

Operation of valve 32 is controlled through a push-rod 60 by a stop member 59 which has a flexible contact finger 61 and is secured to piston rod 22 by a suitable fastener 62, so that its position along the piston rod may be adjusted. Members 59–62 function to operate valve 32 when piston 21 has retracted to a predetermined extent into cylinder 20, as will now be explained, referring to FIGS. 2–4.

One end 70 of cylinder 20 includes a boss 71 having a bore 72 with a central enlargement 73 communicating with passage 33. Boss 71 is tapped to receive the threaded end 74 of port fitting 31, secured in place by a lock nut 75 and sealed with an O-ring 76. Fitting 31 has a central bore 78, which includes a seat 77 for the O-ring 80 of a plunger 81 having a stem 82 which passes through a cupped spacing spider 83 and a retainer seal 84. An O-ring 85 seals around stem 82, and an O-ring 86 engages a shoulder 87 in fitting 31 to prevent leakage between the fitting and seal 84, a wiper seal 90 around the stem being also provided. One end of a helical compression spring 91 engages plunger 81, the other end being retained in fitting 31 by a hollow cup 92 having a flange which engages a shoulder 93 in the fitting 31 and secured in place by the end fitting 94 of conduit 45. Spring 91 normally lifts plunger 81, to open a fluid path from passage 33 through enlargement 73 and bore 78 to conduit 45.

An elongated mounting 100 is secured to cylinder 20, as by welding, and includes a pair of brackets 101 and 102 bored in alignment with the axis of stem 82 to slidingly receive push rod 60. An abutment in the form of a cross pin 103 is provided for push rod 60, and a helical compression spring 104 on push rod 60 has one end engaging bracket 102 and the other end engaging a washer 105 bearing against pin 103, so that push rod 60 is normally held slightly out of contact with stem 82.

Figure 4:
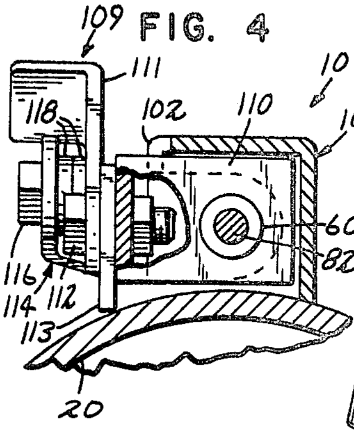
FIG. 4 is a fragmentary sectional view taken along the line 4—4 of FIG. 2.

My invention includes an optional lock mechanism 109. A pivot bracket 110 is free to slide on push rod 60, and a control lever 111 is pivoted to bracket 110 about a fastener 112, which also traverses a spacer 113 for preventing rotation of bracket 110 about the push rod 60 by engaging cylinder 20 as shown in FIG. 4. A link 114 has one end 115 spaced from lever 111 by spacers 118 and pivoted to the lever about a fastener 116 radially spaced from fastener 112. The other end 117 of link 114 is bent and apertured to slidably engage push rod 60. A helical compression spring 120 on push rod 60 engages end 117 of link 114 at one end, and at the other end engages a washer 121 bearing against cross pin 103. Spring 120 is stronger than spring 104, and supports the assembly of members 110–117 on cross pin 103. The spring dimensions are such that in this condition spring 120 is substantially uncompressed. The pivotal movement of lever 111 is sufficient to give overcenter action when the lever is fully actuated in the direction of arrow 122, FIG. 3.

OPERATION

The operation of the invention will now be explained. FIG. 1 shows the system just after arm 11 has been raised and valve 40 has been moved into its "NEUTRAL" position. Hydraulic fluid is trapped in cylinder 20 above and below piston 21 to hold the arm in position. Pump 41 is in operation, and fluid is circulating through relief valve 43 since no other path is available.

If it is desired to raise arm 11 further, valve 40 is moved into a "RAISE" position. Fluid can now pass from reservoir 42 through conduit 51, pump 41, conduits 50 and 47, valve 40, conduit 45, bore 78 of fitting 31, enlargement 73, and passage 33 into cylinder 20 below piston 21, to cause the actuator to extend and move arm 11 in the direction of arrow 34. Fluid from the other side of the piston passes out through port 30, conduit 44, valve 40, and conduit 46 to reservoir 42. When the arm reaches the desired height, valve 40 is returned to its "NEUTRAL" position, and hydraulic operation ceases.

If it is desired to lower arm 11, valve 40 is moved to a "LOWER" position. Fluid can now pass from reservoir 42 through conduit 51, pump 41, conduits 50 and 47, valve 40, conduit 44, and port 30 to the cylinder above piston 21, and fluid can pass from the cylinder through passage 33, enlargement 73 of bore 72, bore 78 of fitting 74, conduit 45, valve 40, and conduit 46 to reservoir 42. This causes or permits arm 11 to move in the direction of arrow 35 until the desired arm attitude is reached, when valve 40 is moved to its "NEUTRAL" position and hydraulic operation ceases.

It frequently happens that there is a particular desired lower position of arm 11, a storage position, for example, which is often to be achieved, and in which it may be desired to leave the arm unattended for relatively long periods. The situations recited in the preceding paragraphs will maintain themselves, even if pump 41 is denergized, because fluid is trapped in the cylinder and conduits 44 and 45 by valve 40. This, however, leaves the system with high pressure in conduit 45 at least, and since the conduits are generally hydraulic hoses and subject to deterioration, this is somewhat hazardous. Even more hazardous is the fact that if valve 40 should accidentally be displaced, in either direction, the hydraulic lock for arm 11 is lost and the arm can descend under gravity, falling substantially freely or driving pump 41 as a fluid motor, if necessary.

To obviate this, the arm is intentionally brought into its desired storage position, fastener 62 is loosened, and stop member 59 is slid along piston rod 22 to engage push rod 60 and push the rod against stem 82 until O-ring 80 enters seat 77, thus closing the path from passage 33 to conduit 45. Stop member 59 is locked in this position by tightening fastener 62. Pressure fluid is now trapped not in conduit 45 but in cylinder 20. Note also that once this has been accomplished, inadvertent movement of valve 40 into the "LOWER" position cannot complete an outlet path for fluid.

Figures 2, 3, 5:
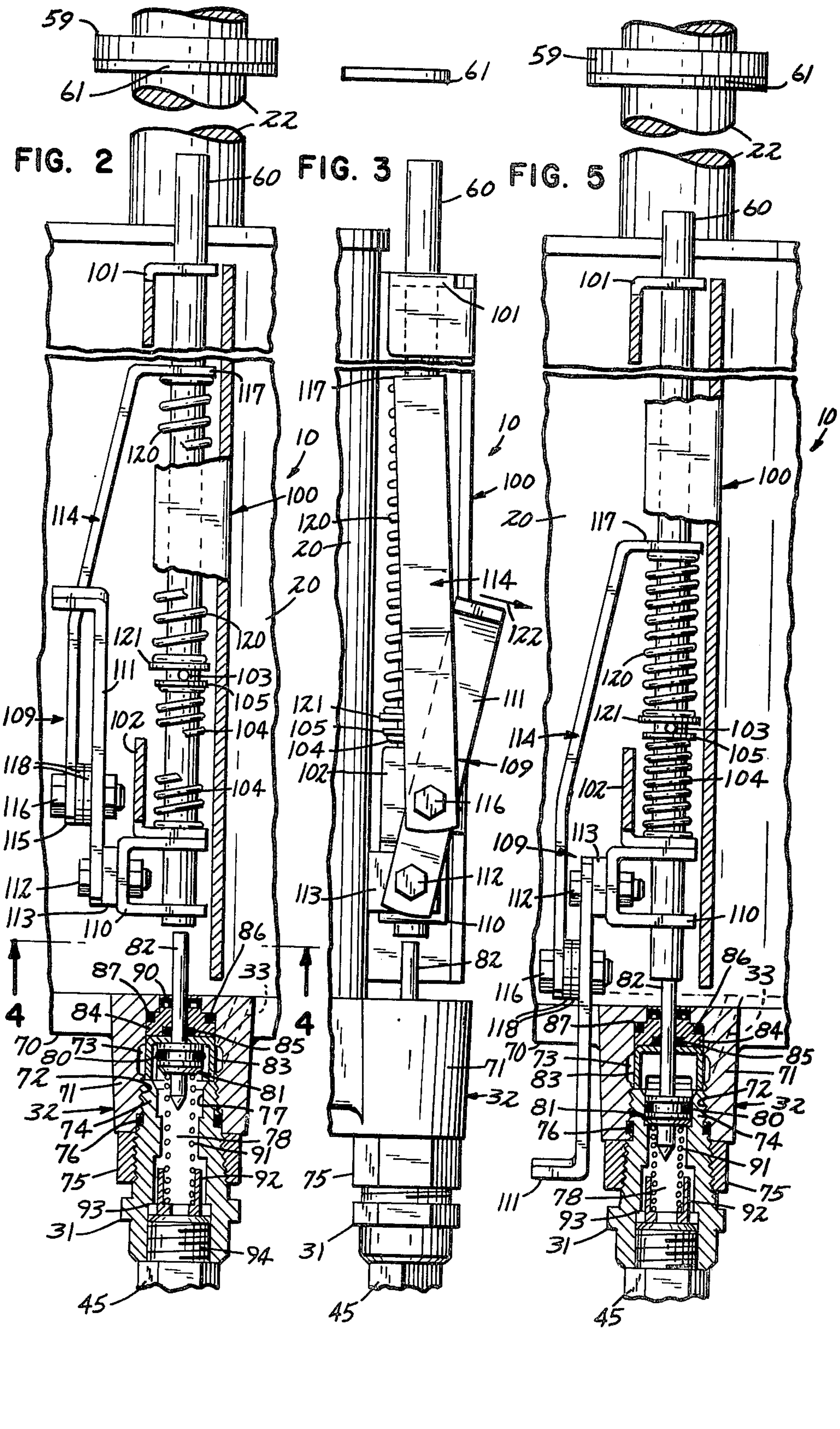
FIGS. 2 and 3 are fragmentary views showing my invention to a larger scale, parts being broken away or shown in section.
FIG. 5 is a view like FIG. 2 but showing a second condition of my invention.

When it is desired thereafter to raise arm 11, pump 41 being in operation, valve 40 is moved to its "RAISE" position. Hydraulic pressure through conduit 45 acts on plunger 81, in a sense to raise the plunger, as seen in FIG. 2. The resulting force is transmitted through stem 82 and push rod 60: these elements are not powerful enough to actually cause movement of arm 11, but contact finger 61 is flexible enough to allow plunger 81 to move out of sealing engagement in seat 77, whereupon hydraulic fluid can pass through passage 33 and cause actuation of piston 21. At any later time, to reach the storage position it is only necessary to set valve 40 in the "LOWER" position: when arm 11 reaches the storage position, it stops automatically by operation of push rod 60 and valve 32, without detailed supervision by the operator. Pump 41 may be denergized and the equipment left unattended.

From the foregoing it will be evident that whenever plunger 81 is in sealing engagement with seat 77, downward movement of arm 11 is prevented, and that this is accomplished by engagement between stop member 59 and rod 60. There is usually a single storage position for arm 11, at which stop member 59 should be set. However, there is sometimes occasion to halt operation of the apparatus in other positions. My invention incorporates means whereby the desirable results of locking plunger 81 in its seat are made available at any point in the travel of piston rod 22 beyond the position at which contact between members 60 and 61 takes place.

To accomplish this, arm 11 is brought to any desired position, and then control lever 111 is manually pivoted about fastener 112, in the direction of arrow 122 of FIG. 3, acting through fastener 116 and link 114 to compress spring 120 and spring 104 between end 117 of the link and bracket 102, against which pivot bracket 110 bears. The arrangement of arm 111, link 114, and fasteners 112 and 116 is such that an over-center action of lever 111 is possible, in which compression of the springs is maintained. Spring compression moves cross pin 103 downwards, as shown in FIG. 5, until push rod 60 engages stem 82 and then actuates valve 32 to prevent further downward movement of arm 111 even if valve 40 is placed in or remains in its "LOWER" position. However, if it is desired to raise arm 11, valve 40 can be placed in its "RAISE" position. Hydraulic pressure in conduit 45 lifts plunger 81 and 82, acting on rod 60 to compress springs 104 and 120 slightly further to permit this, and fluid may now enter cylinder 20 through passage 33. When the valve is restored to its "NEUTRAL" position, the pressure on valve 32 is released, the valve agains closes, and arm 11 is locked in its new position.

Control lever 111 may at any time be restored manually to its position shown in FIGS. 2 and 3, and the apparatus reverts to normal operation, stop member 59 exercising control as previously described.

It is to be noted that push rod 60, pin 103, spring 104, and brackets 101 and 102 are normally provided as parts of actuator 10, as is port fitting 31 with valve 32, so that only parts 110–121 are needed to give the system the added advantages of my invention.

It will be appreciated that if it is desired to limit the extension rather than the retraction of the hydraulic actuator, port fitting 31 can be placed at the other end of the cylinder, and stop member 59 and rod 60 can be arranged to act when the piston rod 22 moves in the other direction. To provide fittings 31 at both ends of the cylinder and modify stop member 59 and push rod 60 accordingly is within the teachings of the invention: optional lock 109 is adaptable for use in any of these further situations.

From the foregoing, it will be evident that I have invented a position lock for hydraulically operated apparatus which can be put in operation manually in any position of the hydraulic actuator and will thereafter prevent retraction of the actuator regardless of inadvertent movement of the control valve which would ordinarily cause that retraction, and regardless of deenergization of the hydraulic pressure source and regardless of failure of hydraulic conduits or leakage of pressure fluid. My invention involves no changes in the hydraulic system, and can be simply applied as a mechanical addition to equipment as supplied.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially of matters of shape, size, and arrangement of parts, within the principle of the invention, to the full extent indicated by the broad general meaning of the terms in which the appended claims are expressed.

We claim:

1. An article of manufacture comprising, in combination:
- a rod having a longitudinal axis;
- means mounting said rod for movement in opposite axial directions;
- first resilient means urging said rod in a first axial direction; and
- means limiting the movement of said rod in said first direction, and operable to overcome said first resilient means and resiliently move said rod in the opposite axial direction.

2. An article according to claim 1 in which the first-named means comprises a bracket through which said rod is moveable axially, in which said first and second directions are opposite with respect to said bracket, and in which the first resilient means and the limiting means include helical springs through which said rod extends.

3. An article according to claim 1 in which the axis of said rod is a straight line.

4. An article according to claim 1 in which the last-named means includes an overcenter mechanism.

5. An article according to claim 1 in which the last-named means includes a helical spring stronger than said first resilient means.

6. An article of manufacture comprising, in combination:
- a push rod having a longitudinal axis;
- means, including first and second spaced brackets traversed by said rod, mounting said rod for movement in opposite axial directions;
- a first helical compression spring through which said rod extends so that one end of said spring acts against said first bracket;
- abutment means fixed to said rod between its ends for engaging the other end of said spring so that said spring resiliently urges said rod in a first axial direction;
- a pivot bracket slidable on said rod on the opposite side of said first bracket from said spring;
- a control lever pivoted to said pivot bracket for movement about a second axis generally orthogonal to said longitudinal axis;
- a link having a first end pivoted to said control lever at a point radially spaced from said second axis, and a second end apertured and positioned to slidingly receive said rod;
- a second helical compression spring through which said rod extends so that one end of said second spring engages said second end of said link, and the other end of said second spring acts against said abutment means, said second spring being stronger than said first spring,
- so that in a first pivoted position of said lever said springs are substantially uncompressed, said pivot bracket is in engagement with said first bracket, and said rod is in a first axial position in the mounting means in which said abutment means is at a first distance from said bracket,
- and so that in a second position of said lever said springs are substantially compressed, said pivot bracket is in engagement with said first bracket, and said rod is in a second axial position in the mounting means in which said abutment means is at a second, smaller distance from said first bracket.

7. In combination:
- a rod having a longitudinal axis;
- means mounting said rod for movement in opposite axial directions;
- controlled means mounted for actuation by one end of said rod upon movement thereof in a first axial direction;
- first resilient means urging said rod in a second axial direction to normally prevent actuation of said controlled means;
- controlling means operable to engage the other end of said rod, to overcome said first resilient means and move said rod to actuate such controlled means; and
- means carried by said rod and operable independently of said controlling means to overcome said first resilient means and move said rod in said first direction to actuate said controlled means.

8. The combination of claim 7, in which the last-named means includes overcenter mechanism for maintaining operations thereof.

9. In a closed pressure fluid actuation system, comprising a cylinder, a piston reciprocable in said cylinder through a range of motion, means affording fluid access to said cylinder at opposite sites beyond said range, a reversible source of pressure fluid having first and second connection ports, means connecting said ports to said sites, valve means operable to prevent egress of fluid from said cylinder at one of said sites, and means moveable with said piston for actuating said valve means when said piston reaches a predetermined position in said range,
- the improvement which comprises means independent of the last-named means and manually operable to releasably cause operation of said valve means regardless of the position of said piston.

10. A closed pressure fluid actuation system comprising a cylinder, a piston reciprocable in said cylinder through a range of motion, means affording fluid access to said cylinder at opposite sites beyond said range, a reversible source of pressure fluid having first and second connection ports, means connecting said ports to said sites, valve means operable to prevent egress of fluid from said cylinder at one of said sites, means moveable with said piston for actuating said valve means when said piston reaches a predetermined position in said range, and means independent of the last-named means and manually operable to releasably cause operation of said valve means regardless of the position of said piston.

11. A fluid actuator comprising, in combination: a cylinder; a piston reciprocable in said cylinder through a range of motion; fluid conduits in communication with said cylinder at sites beyond said range of said piston; valve means operable out of a normal position to prevent egress of fluid from said cylinder through one of said conduits; means, including a push rod, actuable by said piston at a desired point in the travel thereof towards said one end for operating said valve means; and manually actuable means including said push rod for causing operation of said valve means regardless of the position of said piston.

12. A fluid actuator comprising, in combination: a cylinder; a piston reciprocable in said cylinder through a range of motion; fluid conduits in communication with said cylinder at sites beyond said range of said piston; valve means operable out of a normal position to prevent egress of fluid from said cylinder through one of said conduits; resilient means for normally maintaining said valve means in said normal position; means, including a push rod, actuable by said piston at a desired point in the travel thereof towards said one end for overcoming said resilient means and operating said valve means; and manually actuable means including said push rod for causing operation of said valve means regardless of the position of said piston.

13. A fluid actuator comprising, in combination: a cylinder;

a piston reciprocable in said cylinder through a range of motion;

fluid conduits in communication with said cylinder at sites beyond said range of said piston;

valve means linearly operable out of a normal position to prevent egress of fluid from said cylinder through one of said conduits;

resilient means for normally maintaining said valve means in said normal position;

a push rod having a longitudinal axis aligned with the direction of reciprocation of said piston;

means, including first and second spaced brackets traversed by said rod, mounting said rod on said cylinder in alignment with said valve means for movement in opposite axial directions;

a first helical compression spring through which said rod extends so that one end of said spring acts against said first bracket;

abutment means fixed to said rod between its ends for engaging the other end of said spring so that said spring resiliently urges said rod in a first axial direction away from said valve means;

a pivot bracket slidable on said rod on the opposite side of said first bracket from said spring;

a control lever pivoted to said pivot bracket for movement about a second axis generally orthogonal to said longitudinal axis;

a link having a first end pivoted to said control lever at a point radially spaced from said second axis, and a second end apertured and positioned to slidably receive said rod;

a second helical compression spring through which said rod extends so that one end of said second spring engages said second end of said link, and the other end of said second spring acts against said abutment means, said second spring being stronger than said first spring, so that in a first pivoted position of said lever said springs are substantially uncompressed, said pivot bracket is in engagement with said first bracket, and said rod is in a first axial position in the mounting means in which said abutment means is at a first distance for said bracket, and so that in a second position of said lever said springs are substantially compressed, said pivot bracket is in engagement with said first bracket, and said rod is in a second axial position in the mounting means in which said abutment means is at a second, smaller distance from said first bracket;

and means movable with said piston and adjustable axially with respect thereto for engaging one end of said push rod to operate said valve means.

14. In combination:

a fluid actuator including a cylinder, having fluid ports near its ends, and a piston reciprocable in said cylinder between the sites of said ports and having a piston rod extending out of said cylinder;

valve means carried by said actuator and linearly actuable to prevent flow of fluid through one of said ports in a first sense, whereby to prevent movement of said piston in a first direction;

mechanical means, including a stop member adjustable along said piston rod outside said cylinder and a push rod slidably carried by said cylinder, normally operative when said piston, moving in said first direction, reaches a predetermined position to actuate said valve means;

and manual means for operating said push rod independently of the position of said piston, to cause actuation of said valve means.

15. A combination according to claim 14 in which said mechanical means comprises a bracket mounting said push rod for sliding movement and a first compression spring acting between said push rod and said bracket for normally maintaining said push rod out of operative engagement with said valve means, and said manual means includes a second, stronger compression spring acting between said push rod and said bracket in a sense opposite to said first spring, and means for manually compressing said second spring to cause movement of said push rod into operative engagement with said valve means.

16. A combination according to claim 14 or claim 15 including an over center mechanism to maintain operation of said push rod.

* * * * *

UNITED STATES PATENT AND TRADEMARK OFFICE
CERTIFICATE OF CORRECTION

PATENT NO. : 4,267,767

DATED : May 19, 1981

INVENTOR(S) : Gary Hodapp, et al

It is certified that error appears in the above-identified patent and that said Letters Patent are hereby corrected as shown below:

Column 3, line 41, "denergized" should be --deenergized--;

Column 4, line 9, "denergized" should be --deenergized--;

Column 4, line 44, "agains" should be --again--.

Signed and Sealed this

*Twenty-fifth* Day of *August 1981*

[SEAL]

*Attest:*

GERALD J. MOSSINGHOFF

*Attesting Officer* *Commissioner of Patents and Trademarks*